(12) United States Patent
Juillet et al.

(10) Patent No.: US 11,174,654 B2
(45) Date of Patent: Nov. 16, 2021

(54) OVERHEAD ELECTRICAL ACCESSORY BRACKET

(71) Applicant: Richards Manufacturing Company, LP, Irvington, NJ (US)

(72) Inventors: Christopher Juillet, Warren, NJ (US); Richard Fox, Branchburg, NJ (US); Joseph Bier, Warren, NJ (US)

(73) Assignee: Richards Manufacturing Company, a New Jersey Limited Partnership, Irvington, NJ (US)

( * ) Notice: Subject to any disclaimer, the term of this patent is extended or adjusted under 35 U.S.C. 154(b) by 285 days.

(21) Appl. No.: 16/266,057

(22) Filed: Feb. 2, 2019

(65) Prior Publication Data

US 2019/0242150 A1 Aug. 8, 2019

Related U.S. Application Data (60) Provisional application No. 62/625,898, filed on Feb. 2, 2018.

(51) Int. Cl.
*E04H 12/24* (2006.01)
*H02G 7/12* (2006.01)

(52) U.S. Cl.
CPC .............. *E04H 12/24* (2013.01); *H02G 7/12* (2013.01)

(58) Field of Classification Search
USPC .................................................. 248/226.11
See application file for complete search history.

(56) References Cited

U.S. PATENT DOCUMENTS

| | | | | |
|---|---|---|---|---|
| 882,835 A * | 3/1908 | McGillivray | ............. | F16B 7/18 403/388 |
| 2,721,362 A * | 10/1955 | McCoy | .................... | H02G 7/20 174/43 |
| 2,728,462 A * | 12/1955 | Fincher | .................... | H02G 1/04 212/179 |
| 3,129,917 A * | 4/1964 | Huggins | ................... | H02G 7/08 248/218.4 |
| 3,369,788 A * | 2/1968 | Eisele | ....................... | H02B 5/02 211/107 |
| 3,428,283 A * | 2/1969 | Dake | ......................... | H02G 7/20 248/214 |
| 3,445,582 A * | 5/1969 | Ghio, Jr. | ................... | H02G 7/20 174/43 |
| 3,474,995 A * | 10/1969 | Amidon | .................... | H02G 7/20 248/218.4 |
| 3,499,973 A * | 3/1970 | Barnes | ...................... | H02G 7/20 174/149 R |
| 3,568,968 A * | 3/1971 | Taylor | ....................... | H02G 7/20 211/107 |
| 3,772,179 A * | 11/1973 | Beer | ......................... | C23F 13/02 204/196.17 |
| 3,856,250 A * | 12/1974 | Farmer | .................... | H02B 5/02 211/107 |

(Continued)

*Primary Examiner* — Monica E Millner
(74) *Attorney, Agent, or Firm* — Bakos & Kritzer (57) ABSTRACT

An apparatus and method of assembling a bracket assembly on a cross-arm is disclosed. The bracket assembly comprises a bracket, adjustable plate, first accessory frame, and second accessory frame. First accessory frame and second accessory bracket are coupled to the bracket with captive nuts. The bracket assembly is secured to a cross-arm by the adjustable plate, which is coupled to the bracket with at least one guide pin and an adjustable plate bolt.

19 Claims, 9 Drawing Sheets

(56) References Cited

U.S. PATENT DOCUMENTS

| | | | | | |
|---|---|---|---|---|---|
| 4,127,739 | A | * | 11/1978 | Farmer | H02G 7/20 174/45 R |
| 4,932,623 | A | * | 6/1990 | Reisdorff | E04H 12/24 248/219.3 |
| 5,174,535 | A | * | 12/1992 | Stubbersfield | E04H 12/24 248/218.4 |
| 5,426,577 | A | * | 6/1995 | Gordin | E04H 12/24 174/45 R |
| 5,445,348 | A | * | 8/1995 | Caldwell | F16L 3/243 248/74.1 |
| 6,936,779 | B2 | * | 8/2005 | Rhein | H01H 75/04 200/48 R |
| 7,216,850 | B2 | * | 5/2007 | Kwon | H02G 1/02 248/219.4 |
| 7,387,294 | B2 | * | 6/2008 | Kwon | H02G 1/02 248/219.4 |
| 8,919,584 | B2 | * | 12/2014 | Shaw | H02B 5/02 211/107 |
| 9,231,394 | B2 | * | 1/2016 | Cariaga Crespo | H02G 7/05 |
| 2015/0075859 | A1 | * | 3/2015 | Rodriguez | H02G 7/20 174/5 R |
| 2015/0263501 | A1 | * | 9/2015 | Nureddine | H02G 1/02 174/45 R |

* cited by examiner

OVERHEAD ELECTRICAL ACCESSORY BRACKET

CROSS-REFERENCE TO RELATED APPLICATION

This application claims the benefit of U.S. Provisional Application Ser. No. 62/625,898, filed Feb. 2, 2018, and entitled "Overhead Electrical Accessory Bracket," which is hereby incorporated by reference herein in its entirety, including any figures, tables, equations, or drawings.

TECHNICAL FIELD

The apparatus and methods disclosed herein relate to a bracket assembly for securing electrical accessories to a support.

BACKGROUND

Overhead medium voltage electrical accessories, such as lighting arresters, fuse cut-outs, disconnect switches, etc. are commonly mounted to the cross-arms of utility poles. Typically, these electrical accessories are attached to a bracket assembly coupled to the cross-arm. Existing bracket assemblies are secured by utilizing two independent brackets on either side that are secured with carriage bolts positioned at the top and the bottom of the cross-arm. The carriage bolts are secured using standard lock washers and nuts to hold the two brackets against either side of the cross-arm.

Currently, the process to mount existing bracket assemblies to the cross-arm involves an operator to bring the loose bracket assembly components up to the cross-arm. Typically, this is accomplished using a bucket truck. Utility standards dictate that the operator must wear protective gloves and equipment, due to their close proximity to energized components. These protective gloves are heavily insulated, thereby making it difficult for the operator to handle the loose bracket assembly components once up at the cross-arm. As a result, the loose components can be mishandled and dropped to the ground below, potentially posing a safety risk to individuals below. Further, dropping components can significantly increase the installation time of overhead electrical accessories, because the operator may need to descend to the ground to recover the dropped hardware and then ascend to the cross-arm again to complete the installation.

SUMMARY

The principles disclosed herein provide for a bracket assembly system and methods that allows for the installation of all hardware and electrical accessories on the ground prior to ascending to the top of the utility pole. A variety of different electrical accessories may be installed on at least one side of the bracket assembly while on the ground, thereby allowing greater flexibility in aligning the electrical accessories during the final installation. The principles disclosed herein further provide for a bracket assembly system with no loose hardware or components, thereby eliminating the need for a bucket truck, which previously would be required to bring up all the loose hardware and components for installation. Further, the bracket assembly system eliminates the possibility of dropping or mishandling components. As a result, the operator can prevent time spent recovering dropped components.

The principles disclosed herein further allow for the operator to bring the electrical accessories pre-installed on the bracket assembly up to the cross-arm. The bracket assembly is secured to the cross-arm by tightening an adjustable plate of the bracket assembly to the cross-arm, thereby significantly simplifying the installation process for the operator. Once the adjustable plate is secured, the installation process of the bracket assembly is complete and the operator may descend, thereby minimizing the time spent at the top of the utility pole.

BRIEF DESCRIPTION OF THE DRAWINGS

The detailed description makes reference to the accompanying figures wherein.

The figures are only intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be different from those disclosed herein. Consequently, the specific structural and functional details disclosed herein are merely representative.

Figure 1:
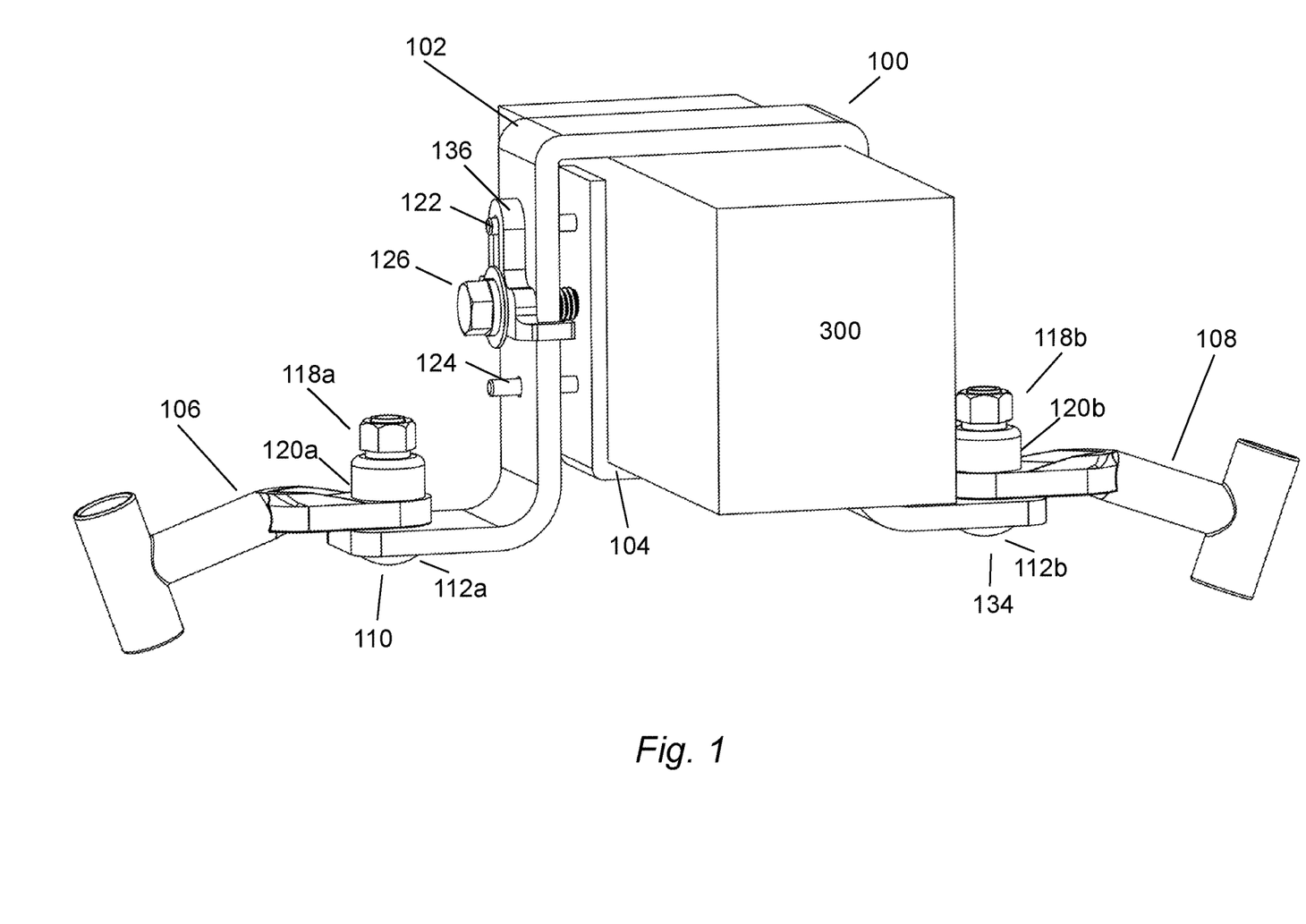
FIG. 1 illustrates a perspective view of an overhead electrical accessory bracket secured to a cross-arm in accordance with the principles disclosed herein.

Referring initially to FIG. 1, shown is bracket assembly 100 secured to cross-arm 300 in accordance with the principles disclosed herein. Bracket assembly 100 comprises bracket 102, adjustable plate 104, first accessory frame 106, and second accessory frame 108. As shown in FIG. 1, bracket 102 is generally U-shaped and positioned over cross-arm 300. Further, adjustable plate 104 is generally L-shaped. As described in further detail below with reference to FIGS. 3-5, the designs of bracket 102 and adjustable plate 104 facilitate securing bracket assembly 100 to cross-arm 300 and cross-arm 400. One of ordinary skill in the art will readily recognize that other shapes can be utilized for bracket 102 and adjustable plate 104 to secure bracket assembly 100 to cross-arm 300 and cross-arm 400, without departing from the principles disclosed herein.

As shown in FIG. 1, first accessory frame 106 is coupled to bracket 102 utilizing first accessory frame fastener 110. An electrical accessory such as a lightning arrester, fuse cut-outs, or disconnect switch can be coupled to first accessory frame 106. First accessory frame fastener 110 comprises bolt 112a and captive nut 118a. As described in detail below with reference to FIG. 3, captive nut 118a is coupled to bolt 112a utilizing captive lock 120a. Similarly, second accessory frame 108 is coupled to bracket 102 utilizing second accessory frame fastener 134. Further, an electrical accessory such as a lightning arrester, fuse cut-outs, or disconnect switch can be coupled to second accessory frame 108. Second accessory frame fastener 134 comprises bolt 112b and captive nut 118b. Captive nut 118b is coupled to bolt 112b utilizing captive lock 120b.

Bracket assembly 100 further comprises first guide pin 122, second guide pin 124, adjustable plate bolt 126, and moveable spacer 136. Moveable spacer 136 is configured to reduce the excessive deformation of bracket 102 when adjustable plate bolt 126 is threadably inserted to secure an adjustable plate to a cross-arm. As shown in FIG. 1, the thickness of moveable spacer 136 limits the distance that adjustable plate bolt 126 can be threadably inserted to secure adjustable plate 104, thereby reducing the potential for failure deformation of bracket 102. Further, moveable spacer 136 is configured to prevent adjustable plate bolt 126 from threadably inserting when adjustable plate 104 is secured to cross-arm 300. As a result, an operator is provided an indicator that a bracket assembly is properly secured to cross-arm 300. As described in detail below with reference to FIG. 5, the adjustable plate bolt, guide pins, and spacer are designed to properly secure adjustable plate 104 to cross-arm 300. One of ordinary skill in the art will readily recognize that other methods for aligning and securing the adjustable plate to a cross-arm can be utilized without departing from the principles disclosed herein.

Figure 2:
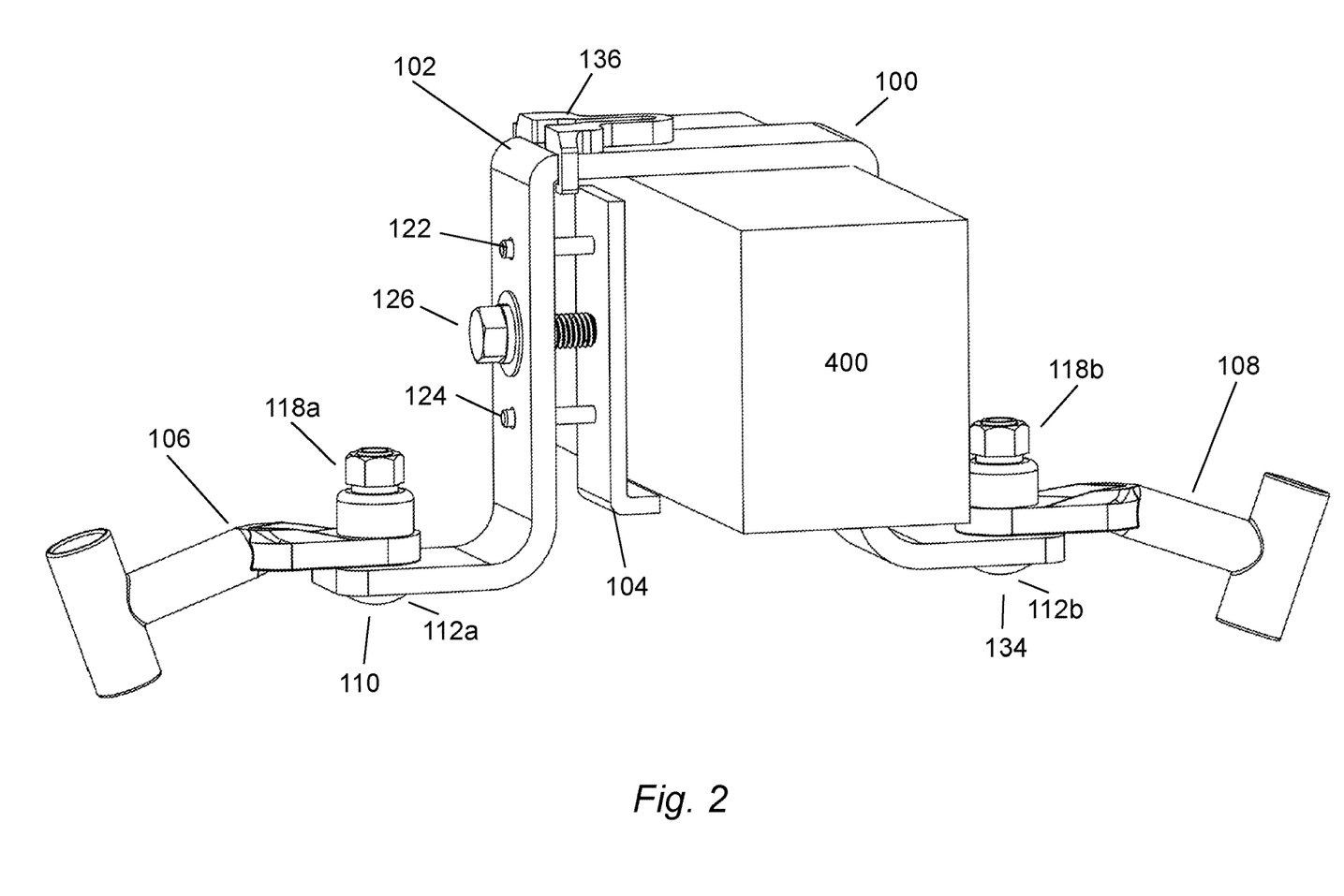
FIG. 2 illustrates a perspective view of an overhead electrical accessory bracket secured to a cross-arm in accordance with the principles disclosed herein.

Referring to FIG. 2, shown is bracket assembly 100 secured to cross-arm 400 in accordance with the principles disclosed herein. The width of cross-arm 400 is less than the width of cross-arm 300 shown in FIG. 1. As a result, moveable spacer 136 has been positioned on bracket 102 such that it does not limit the distance that adjustable plate bolt 126 can be threadably inserted to secure adjustable plate 104 to cross-arm 400. Further, moveable spacer 136 remains secured to bracket 102, such that its position can be adjusted on ground level or when the utility personnel is on top of a utility pole without becoming loose from bracket 102. An exemplary method of securing a moveable spacer to a bracket utilizes guides that are generally c channel shaped. The guides include enough clearance to allow the moveable spacer to move along and remain secure to the bracket. One of ordinary skill in the art will readily recognize that other methods for securing the moveable spacer to a bracket can be utilized without departing from the principles disclosed herein.

Figure 3:
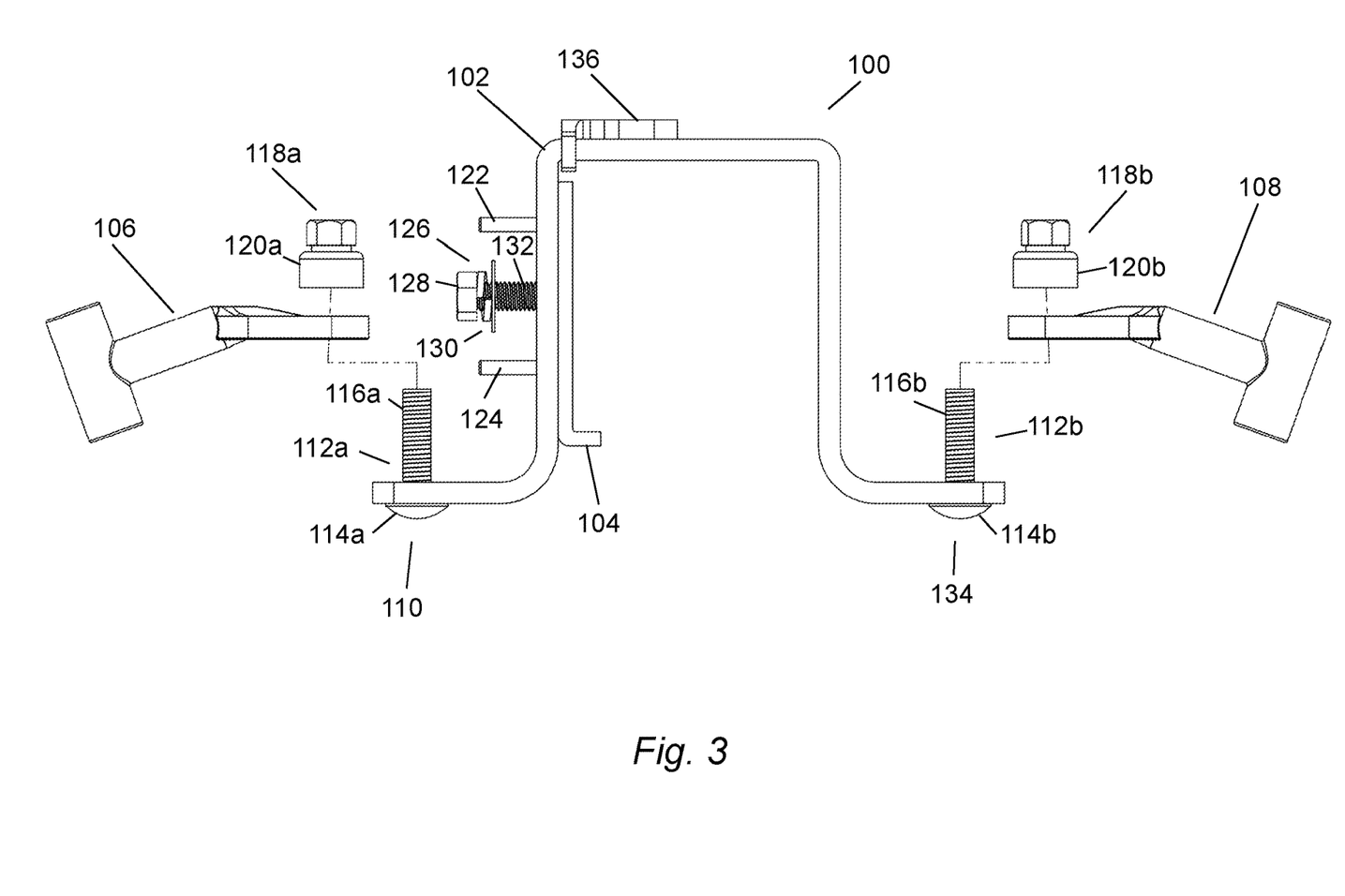
FIG. 3 illustrates a front view of a step of a process of assembling an overhead electrical accessory in accordance with the principles disclosed herein.

Turning to FIG. 3, shown is a step of a process of securing bracket assembly 100 to a cross-arm in accordance with the principles disclosed herein. First accessory frame 106 and second accessory frame 108 are coupled to bracket 102 utilizing first accessory frame fastener 110 and second accessory frame fastener 134, respectively. With respect to first accessory frame 106, bolt 112a of first accessory frame fastener 110 is inserted into an opening in bracket 102. Bolt 112a comprises bolt head 114a and threaded portion 116a. As shown in FIG. 3, the diameter of bolt head 114a is greater than the diameter of the opening in bracket 102 that threaded portion 116a of bolt 112a is inserted through. Next, first accessory frame 106 is coupled to bolt 112a by inserting threaded portion 116a through an opening in first accessory frame 106. Thereafter, captive nut 118a is threadably coupled to threaded portion 116a of bolt 112a to secure first accessory frame 106 to bracket 102. Captive nut 118a is configured to prevent first accessory frame 106 and bolt 112a from becoming loose during the assembly of bracket assembly 100 to a cross-arm. Captive nut 118a comprises captive lock 120a which is configured to secure to threaded portion 116a. As shown in FIG. 3, captive nut 118a and captive lock 120a are integral. An exemplary captive lock comprises a nylon insert located in a tapered section. The nylon insert can comprise an inner diameter that is slightly smaller than the diameter of a threaded portion of the bolt. Therefore, the nylon insert deforms over the threads of the threaded portion as the captive nut is threadably coupled to the threaded portion. One of ordinary skill in the art will readily recognize that other methods for securing the bracket assembly, including other methods for securing a nut to a bolt can be utilized without departing from the principles disclosed herein.

With respect to second accessory frame 108, bolt 112b of second accessory frame fastener 134 is inserted into an opening in bracket 102. One of ordinary skill in the art will readily recognize that the orientation of the fastener openings of second accessory frame fastener 134 and first accessory frame fastener 110 can be modified without departing from the principles disclosed herein (i.e., in FIG. 3, the opening for second accessory frame fastener 134 allowing for the insertion into bracket 102 is shown opposite from the opening for first accessory frame fastener 110 allowing for the insertion into bracket 102). Bolt 112b comprises bolt head 114b and threaded portion 116b. As shown in FIG. 3, the diameter of bolt head 114b is greater than the diameter of the opening in bracket 102 that threaded portion 116b of bolt 112b is inserted through. Next, second accessory frame 108 is coupled to bolt 112b by inserting threaded portion 116b through an opening in second accessory frame 108. Thereafter, captive nut 118b is threadably coupled to threaded portion 116b of bolt 112b to secure second accessory frame 108 to bracket 102. Captive nut 118b is configured to prevent second accessory frame 108 and bolt 112b from becoming loose during the assembly of bracket assembly 100 to a cross-arm. Captive nut 118b comprises captive lock 120b which is configured to secure to threaded portion 116b. As shown in FIG. 3, captive nut 118b and captive lock 120b are integral. The process of securing the first accessory frame and the second accessory frame can be performed on ground level without the need for protective equipment as the system is not energized and the work is not performed in close proximity to energized components.

As further shown in FIG. 3, adjustable plate 104 is removably coupled to bracket 102 with first guide pin 122, second guide pin 124, and adjustable plate bolt 126. Adjustable plate bolt 126 comprises head 128, locking device 130, and threaded portion 132. Threaded portion 132 of adjustable plate bolt 126 is threadably inserted into an opening of bracket 102. An end of threaded portion 132 is coupled to adjustable plate 104, such that adjustable plate 104 moves parallel to the direction of threaded portion 132 threadably inserted into an opening of bracket 102. First guide pin 122 and second guide pin 124 are coupled to adjustable plate 104 and inserted into an opening in bracket 102. Further, moveable spacer 136 has been positioned on bracket 102 such that it does not limit the distance that adjustable plate bolt 126 can be threadably inserted to secure adjustable plate 104 to a cross-arm. One of ordinary skill in the art will readily recognize that the position of the guide pins and moveable spacer can be adjusted without departing from the principles disclosed herein. The process of coupling the adjustable plate to the bracket can be performed on ground level without the need for protective equipment.

Figure 4:
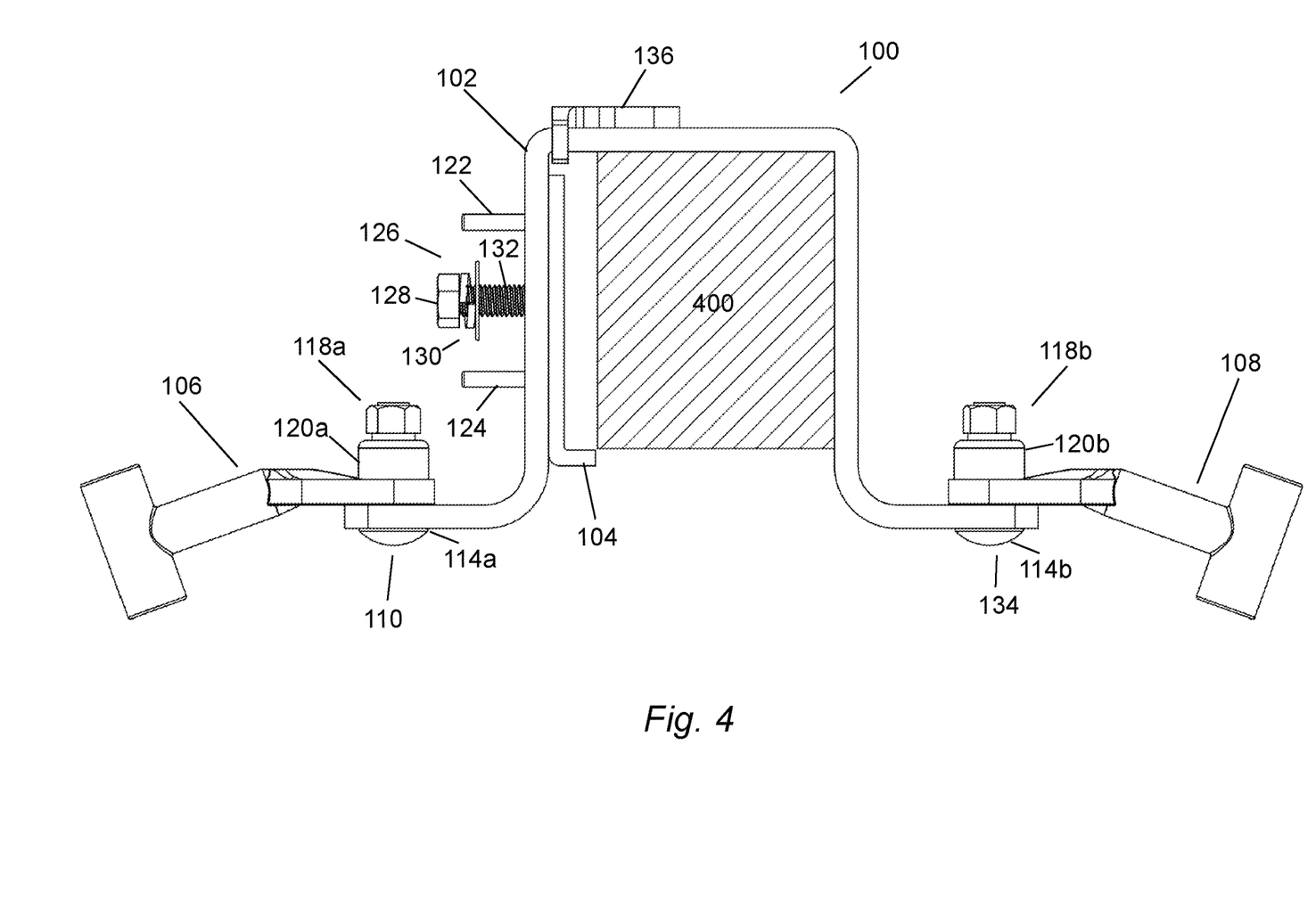
FIG. 4 illustrates a front view of a step of a process of attaching an overhead electrical accessory bracket to a cross-arm in accordance with the principles disclosed herein.

In FIG. 4, bracket assembly 100 is shown positioned on cross-arm 400. The process of securing bracket assembly 100 to cross-arm 400 involves turning head 128 of adjustable plate bolt 126. As head 128 is turned clockwise, threaded portion 132 of adjustable plate bolt 126 threadably inserts into an opening in bracket 102 and moves adjustable plate 104 towards cross-arm 400. Locking device 130 is configured to prevent adjustable plate bolt 126 from loosening once adjustable plate 104 is secured to a cross-arm. An exemplary locking device can comprise a flat washer and split lock washer. Turning head 128 in a counterclockwise direction threadably removes threaded portion 132 from an opening in bracket 102 and moves adjustable plate 104 away from cross-arm 400.

Figure 5:
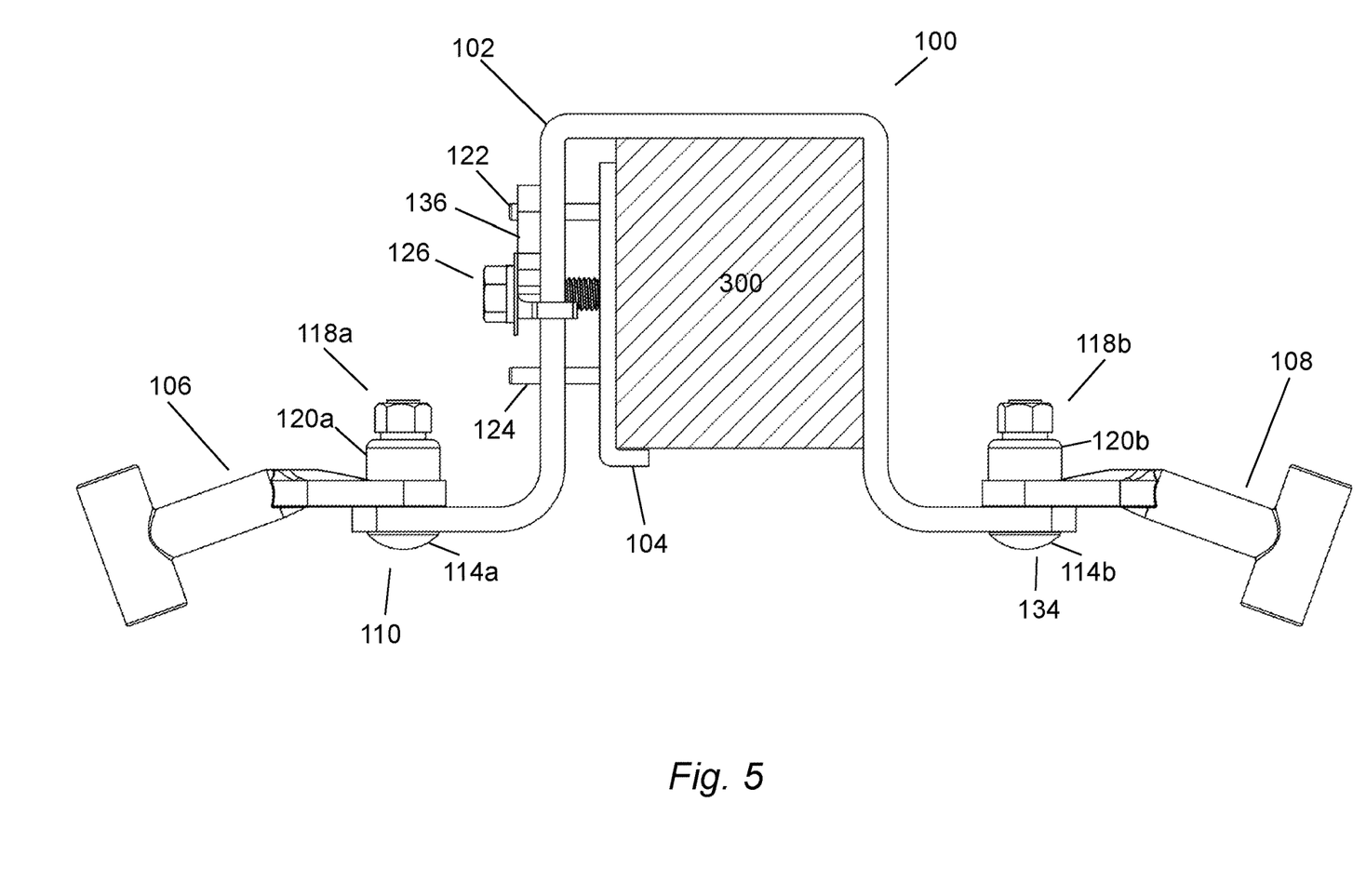
FIG. 5 illustrates a front view of an overhead electrical accessory bracket secured to a cross-arm in accordance with the principles disclosed herein.

FIG. 5 depicts bracket assembly 100 secured to cross-arm 300. Moveable spacer 136 has been positioned to limit the distance that adjustable plate bolt 126 can be threadably inserted to secure adjustable plate 104 to cross-arm 300.

Figure 6:
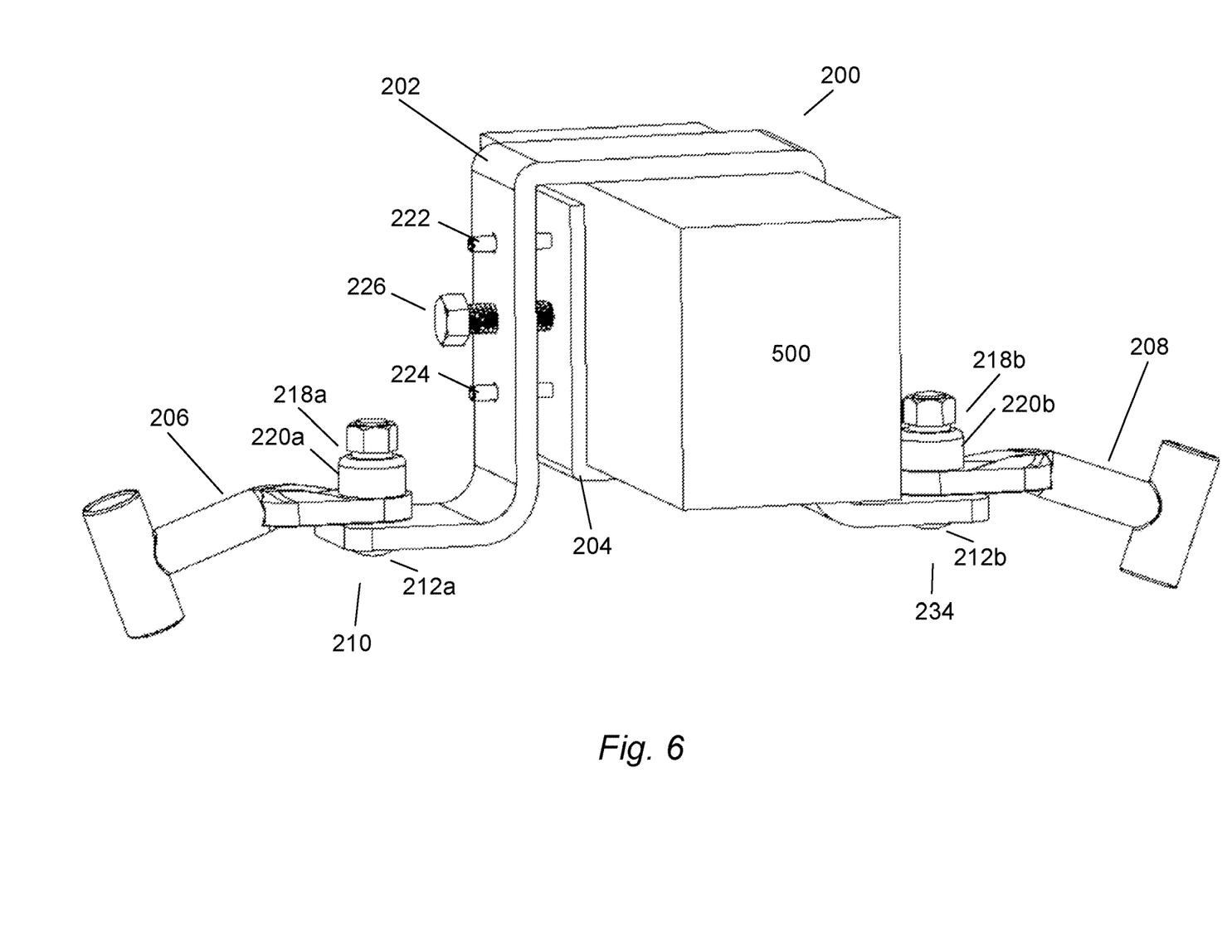
FIG. 6 illustrates a perspective view of an overhead electrical accessory bracket secured to a cross-arm in accordance with the principles disclosed herein.

Turning to FIG. 6, shown is bracket assembly 200 secured to cross-arm 500 in accordance with the principles disclosed herein. Bracket assembly 200 comprises bracket 202, adjustable plate 204, first accessory frame 206, and second accessory frame 208. As shown in FIG. 6, bracket 202 is generally U-shaped and positioned over cross-arm 500. Further, adjustable plate 204 is generally L-shaped. As described in further detail below with reference to FIG. 8 and FIG. 9, the design of bracket 202 and adjustable plate 204 facilitate securing bracket assembly 200 to cross-arm 500. One of ordinary skill in the art will readily recognize that other shapes can be utilized for bracket 202 and adjustable plate 204 to secure bracket assembly 200 to cross-arm 500, without departing from the principles disclosed herein.

As shown in FIG. 6, first accessory frame 206 is coupled to bracket 202 utilizing first accessory frame fastener 210. An electrical accessory such as a lightning arrester, fuse cut-outs, or disconnect switch can be coupled to first accessory frame 206. First accessory frame fastener 210 comprises bolt 212a and captive nut 218a. As described in detail below with reference to FIG. 7, captive nut 218a is coupled to bolt 212a utilizing captive lock 220a. Similarly, second accessory frame 208 is coupled to bracket 202 utilizing second accessory frame fastener 234. Second accessory frame fastener 234 comprises bolt 212b and captive nut 218b. Captive nut 218b comprises captive lock 220b.

Bracket assembly 200 further comprises first guide pin 222, second guide pin 224, and adjustable plate bolt 226. As described in detail below with reference to FIGS. 7-9, the adjustable plate bolt and guide pins are designed to properly secure adjustable plate 204 to cross-arm 500. One of ordinary skill in the art will readily recognize that other methods for aligning and securing the adjustable plate to a cross-arm can be utilized without departing from the principles disclosed herein.

Figure 7:
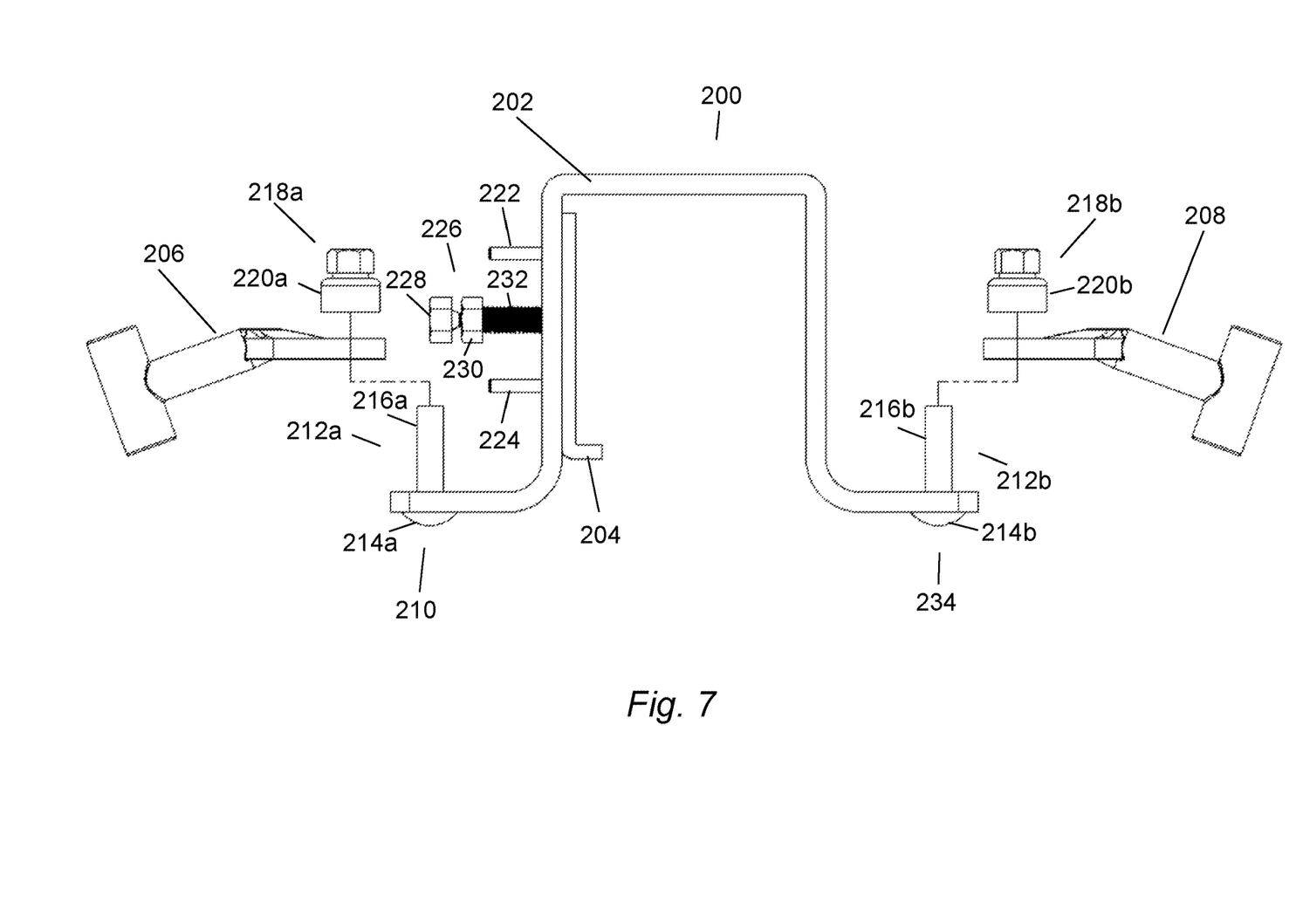
FIG. 7 illustrates a front view of a step of a process of assembling an overhead electrical accessory bracket in accordance with the principles disclosed herein.
Figure 8:
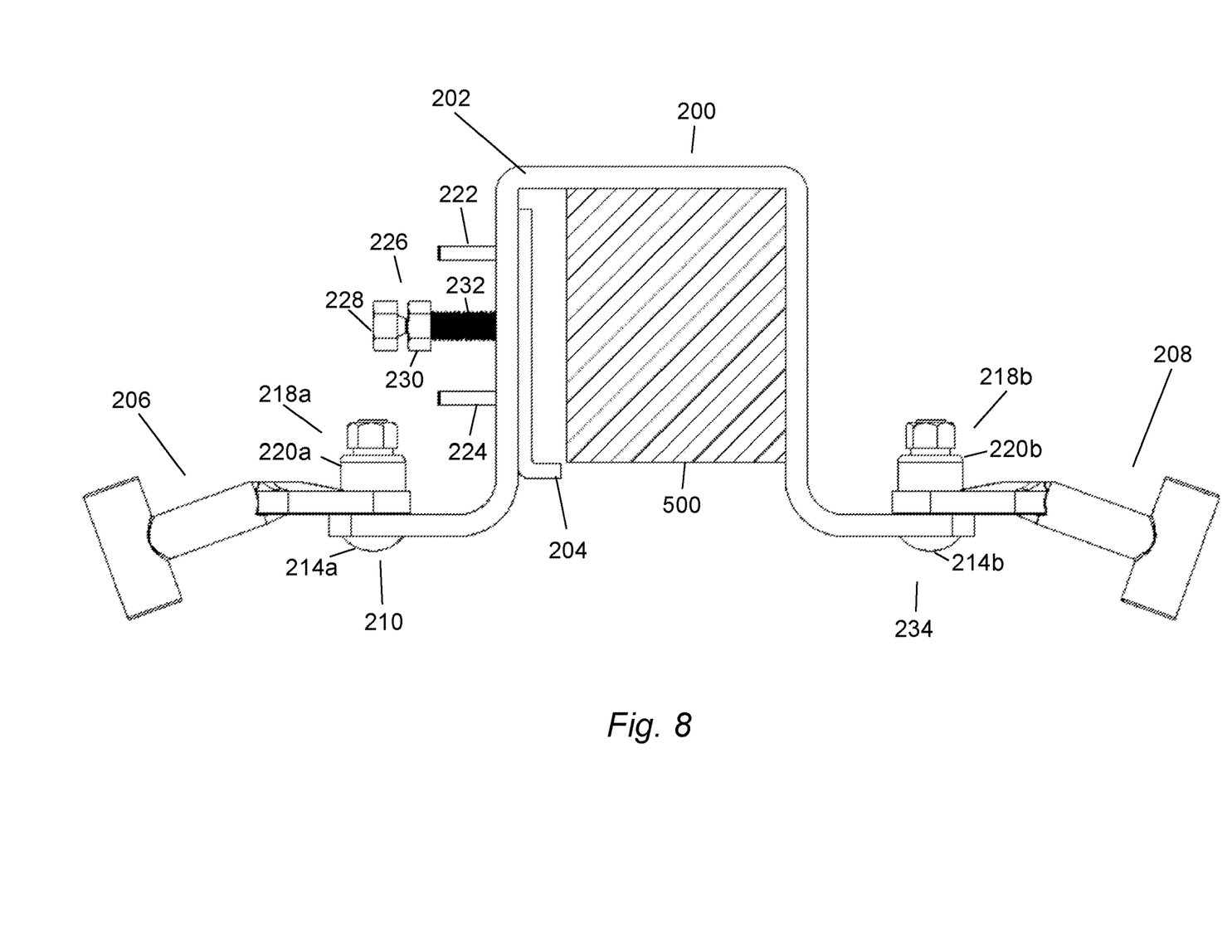
FIG. 8 illustrates a front view of a step of a process of attaching an overhead electrical accessory bracket to a cross-arm in accordance with the principles disclosed herein.
Figure 9:
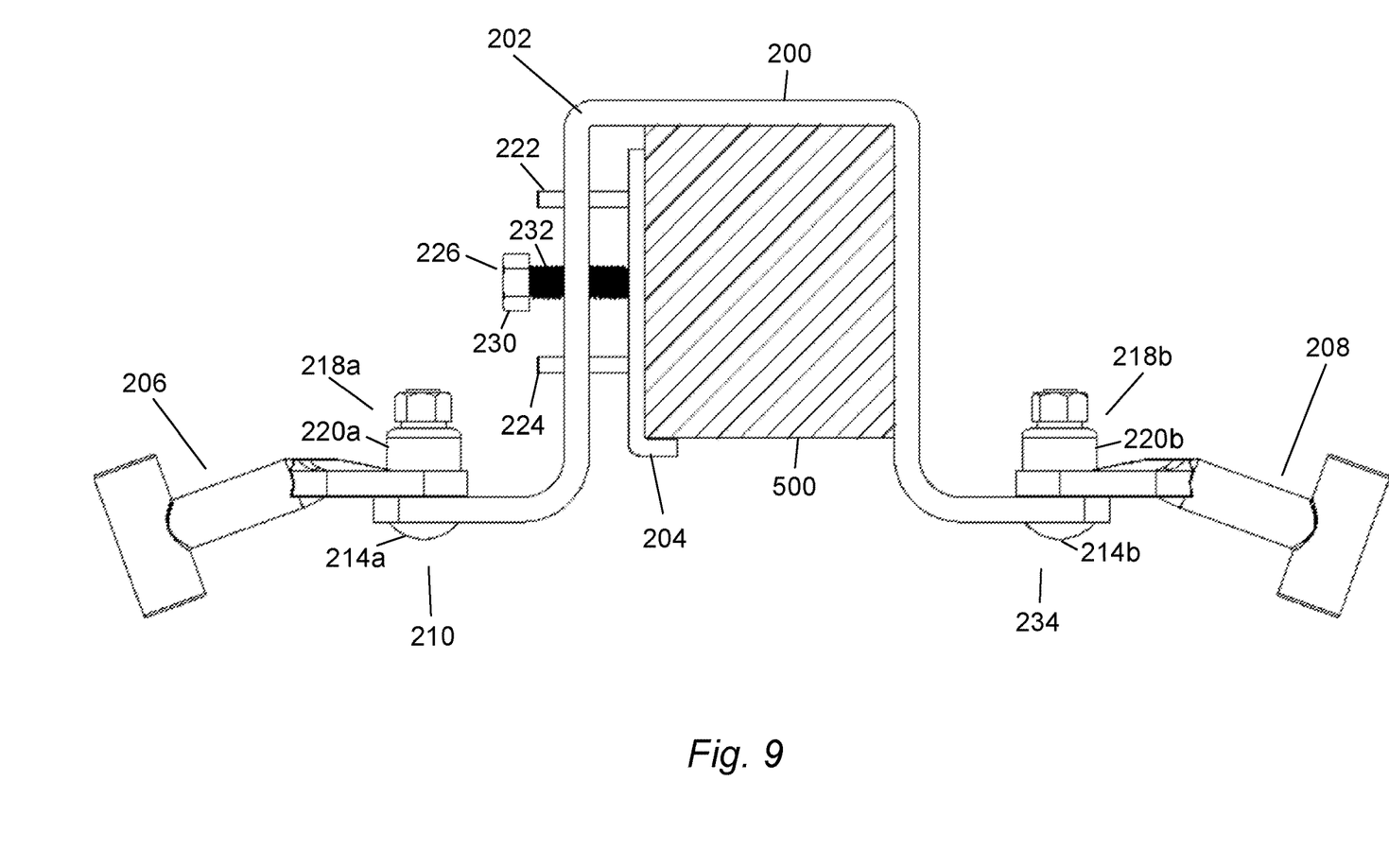
FIG. 9 illustrates a front view of a step of a process for securing an overhead electrical accessory bracket to a cross-arm in accordance with the principles disclosed herein.

Referring to FIGS. 7-9, shown is a process of securing bracket assembly 200 to cross-arm 500. In FIG. 7, first accessory frame 206 and second accessory frame 208 are coupled to bracket 202 utilizing first accessory frame fastener 210 and second accessory frame fastener 234, respectively. With respect to first accessory frame 206, bolt 212a of first accessory frame fastener 210 is inserted into an opening in bracket 202. Bolt 212a comprises bolt head 214a and threaded portion 216a. As shown in FIG. 7, the diameter of bolt head 214a is greater than the diameter of the opening in bracket 202 that threaded portion 216a of bolt 212a is inserted through. Next, first accessory frame 206 is coupled to bolt 212a by inserting threaded portion 216a through an opening in first accessory frame 206. Thereafter, captive nut 218a is threadably coupled to threaded portion 216a of bolt 212a to secure first accessory frame 206 to bracket 202. Captive nut 218a is configured to prevent first accessory frame 206 and bolt 212a from becoming loose during the assembly of bracket assembly 200 to a cross-arm. Captive nut 218a comprises captive lock 220a which is configured to secure to threaded portion 216a. As shown in FIG. 7, for exemplary purposes, captive nut 218a and captive lock 220a are integral. An exemplary captive lock comprises a nylon insert located in a tapered section. The nylon insert can comprise an inner diameter that is slightly smaller than the diameter of a threaded portion of the bolt. Therefore, the nylon insert deforms over the threads of the threaded portion as the captive nut is threadably coupled to the threaded portion. One of ordinary skill in the art will readily recognize that other methods for securing a nut to a bolt can be utilized without departing from the principles disclosed herein.

With respect to second accessory frame 208, bolt 212b of second accessory frame fastener 234 is inserted into an opening in bracket 202. One of ordinary skill in the art will readily recognize that the orientation of the fastener openings of second accessory frame fastener 234 and first accessory frame fastener 210 can be modified without departing from the principles disclosed herein (i.e., in FIG. 7, the opening for second accessory frame fastener 234 allowing for the insertion into bracket 102 is shown opposite from the opening for first accessory frame fastener 210 allowing for the insertion into bracket 202). Bolt 212b comprises bolt head 214b and threaded portion 216b. As shown in FIG. 7, the diameter of bolt head 214b is greater than the diameter of the opening in bracket 202 that threaded portion 216b of bolt 212b is inserted through. Next, second accessory frame 208 is coupled to bolt 212b by inserting threaded portion 216b through an opening in second accessory frame 208. Thereafter, captive nut 218b is threadably coupled to threaded portion 216b of bolt 212b to secure second accessory frame 208 to bracket 202. Captive nut 218b is configured to prevent second accessory frame 208 and bolt 212b from becoming loose during the assembly of bracket assembly 200 to a cross-arm. Captive nut 218b comprises captive lock 220b which is configured to secure to threaded portion 216b. As shown in FIG. 7, for exemplary purposes, captive nut 218b and captive lock 220b are integral. The process of securing the first accessory frame and second accessory frame can be performed on ground level without the need for protective equipment.

As further shown in FIG. 7, adjustable plate 204 is removably coupled to bracket 202 with first guide pin 222, second guide pin 224, and adjustable plate bolt 226. Adjustable plate bolt 226 comprises shear head 228, head 230, and threaded portion 232. Threaded portion 232 of adjustable plate bolt 226 is threadably inserted into an opening of bracket 202. An end of threaded portion 232 is coupled to adjustable plate 204, such that adjustable plate 204 moves parallel to the length of threaded portion 232 when it is threadably inserted into an opening of bracket 202. First guide pin 222 and second guide pin 224 are coupled to adjustable plate 204 and inserted into an opening in bracket 202. One of ordinary skill in the art will readily recognize that the position of the guide pins can be adjusted without departing from the principles disclosed herein. The process of coupling the adjustable plate to the bracket can be performed on ground level without the need for protective equipment.

In FIG. 8, bracket assembly 200 is shown positioned on cross-arm 500. The process of securing bracket assembly 200 to cross-arm 500 involves turning shear head 228 of adjustable plate bolt 226. As shear head 228 is turned clockwise, threaded portion 232 of adjustable plate bolt 226 threadably inserts into an opening in bracket 202 and moves adjustable plate 204 towards cross-arm 500. Turning shear head 228 in a counterclockwise direction threadably removes threaded portion 232 from an opening in bracket 202 and moves adjustable plate 204 away from cross-arm 500.

As shown in FIG. 9, the shear head (not shown) is configured to shear from adjustable plate bolt 226 when the adequate torque for securing bracket assembly 200 to cross-arm 500 has been obtained. An exemplary torque is 15-20 ft-lbs. Thereafter, head 230 of adjustable plate bolt 226 can be utilized to unsecure bracket assembly 200 from cross-arm 500.

The detailed description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. A bracket assembly configured to be securable to a cross-arm, the bracket assembly comprising:
    a bracket comprising a substantially U shaped section with a first flat section and a second flat section;
    an adjustable plate movably engaged with the first flat section of the bracket;
    a bolt coupled to the first flat section of the bracket and coupled to the adjustable plate, the bolt configured to move the adjustable plate away from the first flat section of the bracket and towards the second flat section of the bracket when the bolt is tightened; and
    at least one accessory frame fastener configured to removably couple an accessory frame to the bracket.

2. The bracket assembly of claim 1, wherein the accessory frame is configured to couple to an electrical accessory.

3. The bracket assembly of claim 1, wherein the adjustable plate comprises a substantially L-shape and at least one guide pin.

4. The bracket assembly of claim 3, wherein the bolt is inserted into an opening in the bracket.

5. The bracket assembly of claim 1, further comprising a moveable spacer.

6. The bracket assembly of claim 5, wherein the moveable spacer is coupled to the bracket.

7. The bracket assembly of claim 4, wherein the bolt comprises a head, a locking portion, and a threaded portion.

8. The bracket assembly of claim 4, wherein the bolt comprises a shear head, a head, and a threaded portion.

9. A bracket assembly configured to be securable to a cross-arm, the bracket assembly comprising:
    a bracket comprising a substantially U shaped section with a first flat section and a second flat section;
    an adjustable plate movably engaged with the first flat section of the bracket;
    a first guide pin coupled to the adjustable plate;
    a second guide pin coupled to the adjustable plate;
    a bolt engaged with the first flat section of the bracket and coupled to the adjustable plate, the bolt configured to move the adjustable plate away from the first flat section of the bracket and towards the second flat section of the bracket when the bolt is tightened;
    a first accessory frame fastener coupled to the bracket and configured to removably couple a first accessory frame to the bracket; and
    a second accessory frame fastener coupled to the bracket and configured to removably couple a second accessory frame to the bracket.

10. The bracket assembly of claim 9, wherein the adjustable plate comprises a substantially L-shape.

11. The bracket assembly of claim 9, further comprising a moveable spacer.

12. The bracket assembly of claim 9, wherein the bolt comprises a head, a locking portion, and a threaded portion.

13. The bracket assembly of claim 9, wherein the bolt comprises a shear head, a locking portion, and a threaded portion.

14. A method of securing a bracket assembly with an electrical accessory frame to a cross arm, comprising the steps of:
    coupling an adjustable plate to a bracket with at least one guide pin;
    coupling at least one accessory frame to the bracket;
    positioning a length of the adjustable plate on a first side of the cross arm;
    positioning a length of the bracket on a second side of the cross arm opposite the first side; and
    securing the adjustable plate, the bracket, and the at least one accessory frame to the cross arm by tightening a bolt engaged with a hole in the bracket and in contact with the adjustable plate.

15. The method of claim 14, wherein the step of coupling the at least one accessory frame to the bracket comprises utilizing at least one captive nut.

16. The method of claim 14, further comprising the step:
    positioning a movable spacer between the adjustable plate and the bracket.

17. The bracket assembly of claim 1, wherein the adjustable plate comprises two guide pins.

18. The bracket assembly of claim 1, wherein the at least one accessory frame fastener comprises a captive lock.

19. The bracket assembly of claim 9, wherein the first accessory frame fastener comprises a captive lock.

* * * * *